Oct. 23, 1928.  
A. MOORHOUSE  
BRAKE OPERATING MECHANISM  
Filed May 5, 1923  
1,688,740  
2 Sheets-Sheet 2
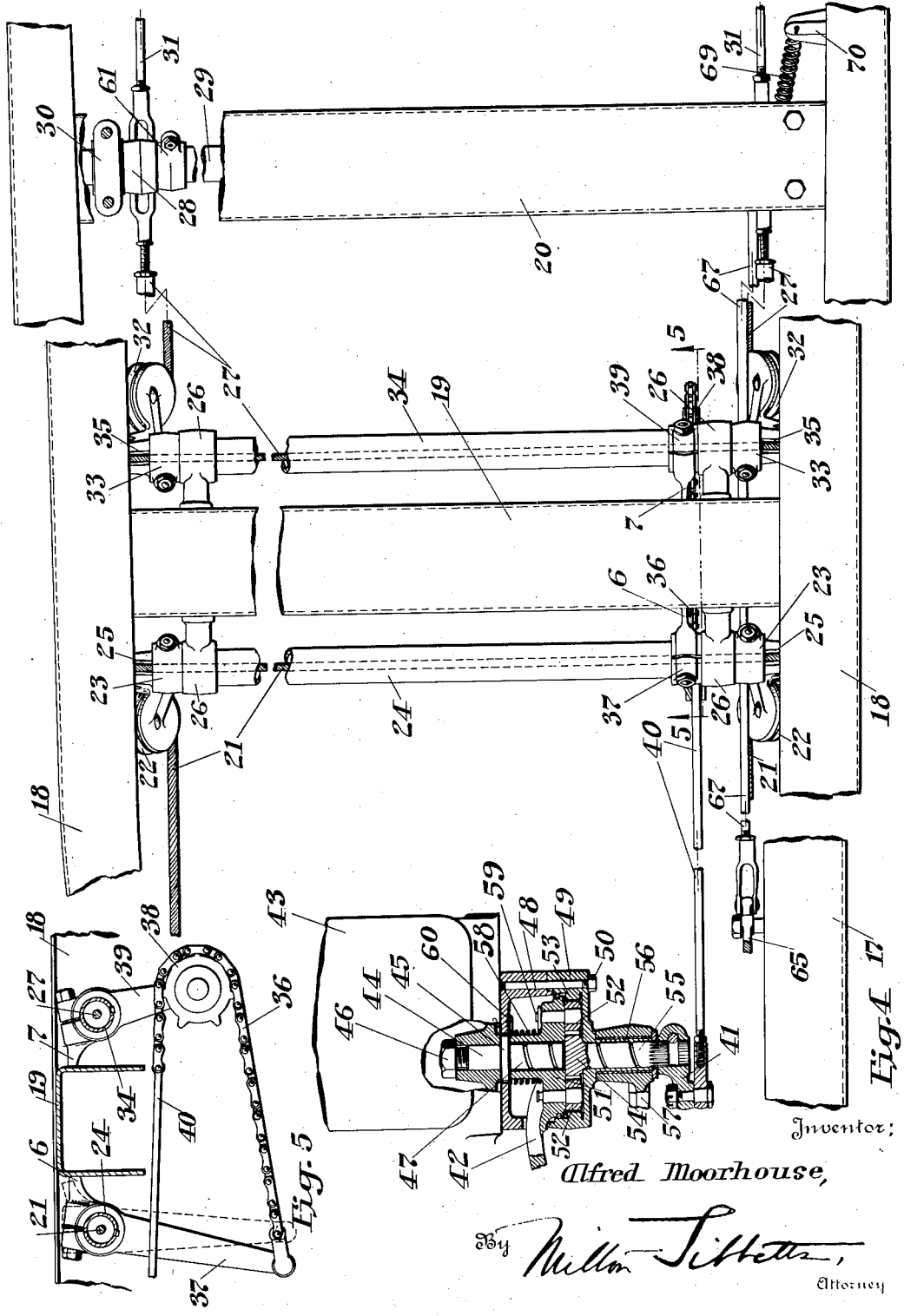
Inventor;  
Alfred Moorhouse,  
By  
Attorney Patented Oct. 23, 1928.

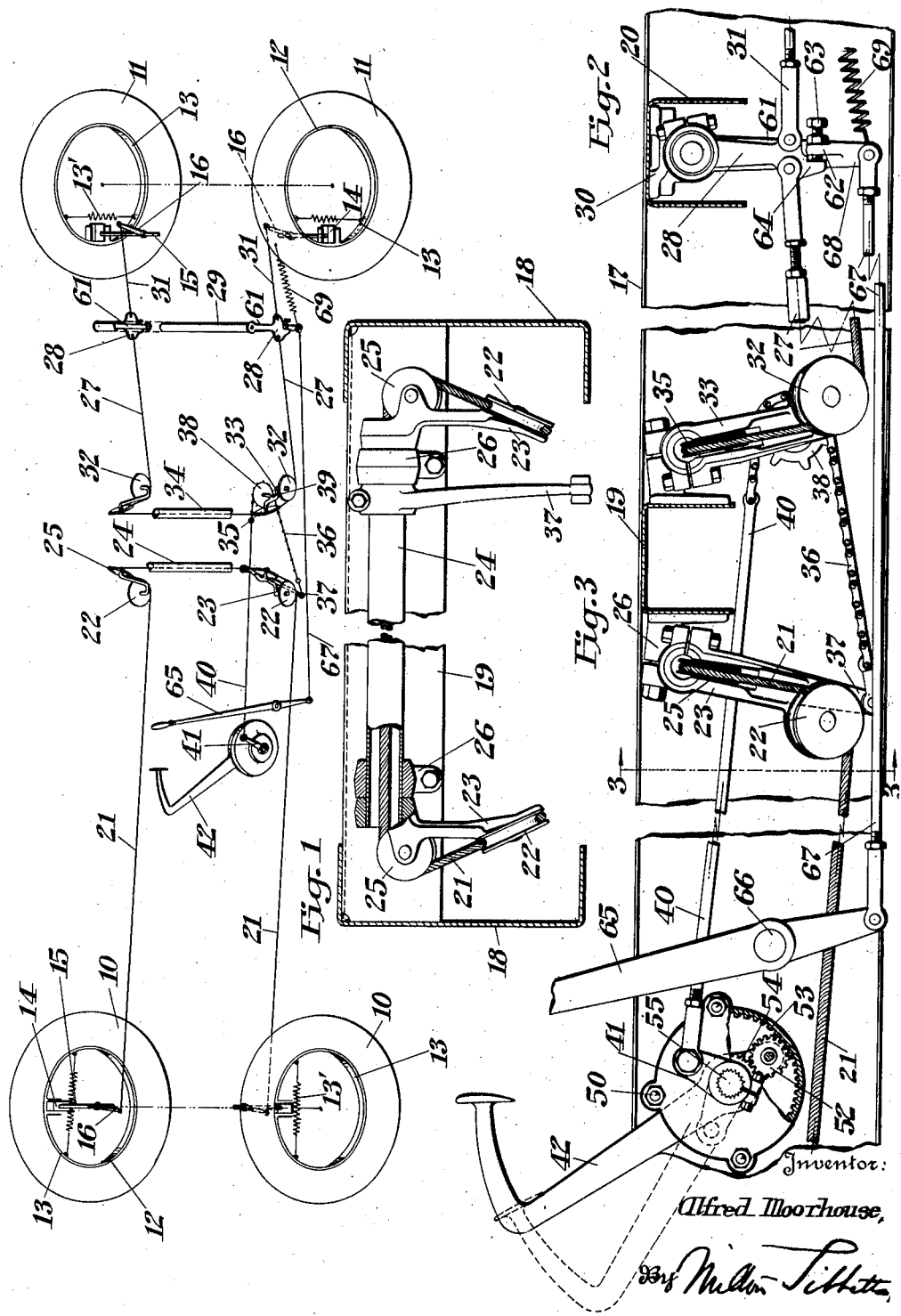

1,688,740

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

BRAKE-OPERATING MECHANISM.

Application filed May 5, 1923. Serial No. 636,969.

This invention relates to motor vehicles and particularly to brake operating mechanism for such vehicles.

One of the objects of the present invention is to provide a simple and safe operating mechanism for multiple brakes.

Another object of the invention is to provide cable operating devices for four wheels of a motor vehicle together with means for operating part only of said brakes independently of the cable devices.

Another object of the invention is to provide, in a four wheel brake construction, equalizing connections in pairs for said brakes, an equalizing device for operating both pairs simultaneously, and independent means for operating one of said pairs.

Another object of the invention is to provide, in a four wheel brake construction, equalizing connections in pairs for said brakes, an equalizing device for operating both pairs simultaneously, and a multiplying leverage device for operating said equalizing device.

Another object of the invention is to provide cable equalizing connections for all of the brakes of a multiple brake system in combination with means for readily applying all of said brakes simultaneously with a short movement of the foot lever.

Another object of the invention is to provide separate rock shafts for operating separate brake pairs, together with a single means operating in one direction for simultaneously rocking said shafts with substantially the same applied force.

Another object of the invention is to provide duplicate means of novel form for independently applying the brakes of a motor vehicle.

Other objects of the invention will appear from the following description taken in connection with the drawings, which form a part of this specification, and in which:

Fig. 1 is a diagrammatic view showing a brake operating mechanism applied to a motor vehicle in accordance with this invention;

Fig. 2 is a side elevation and part section of a motor vehicle frame with the various parts of my brake operating mechanism mounted thereon;

Fig. 3 is a cross sectional view substantially on the line 3—3 of Fig. 2;

Fig. 4 is a plan view of the motor vehicle frame and brake operating mechanism illustrated in Figs. 2 and 3; and Fig. 5 is a section substantially on the line 5—5 of Fig. 4.

Referring to the drawings, 10 represents the front wheels and 11 the rear wheels of a motor vehicle, each of which wheels is provided with a brake drum 12 and a brake 13 of any desired form. As shown, each of these brakes 13 is operated by a cam 14 mounted on a short shaft 15, with an arm 16 on each of said shafts.

The vehicle frame is indicated generally by the numeral 17, and 18 indicates the side members and 19 and 20 indicate respectively two of the cross members. Upon this frame is supported the various parts of the brake operating mechanism. For the purpose of clearness in the diagrammatic illustration of Fig. 1 the frame is omitted and so are some of the cross tubes and other parts of the mechanism. The relationship of the various parts, however, is clearly illustrated in the other views.

The brakes 13 may be said to be divided into pairs and as shown the front wheel brakes comprise one pair and the rear wheel brakes another pair. Each of these pairs of brakes is operated by means of an equalizing cable and each cable has a rock shaft and pulleys for applying the brakes. The equalizing cable for the brakes of the front wheels is indicated at 21 and the ends of this cable are connected to the lever arms 16 of those brakes. The bight of the cable passes over sheaves 22 on the ends of arms 23 on a rock shaft 24 and over sheaves 25 at the ends of the rock shaft, and the bight passes through the rock shaft 24. The rock shaft 24 is supported on the cross member 19 of the frame as by a pair of brackets 26, shown in Fig. 3. Thus it will be seen that the rocking of the shaft 24 so that the sheaves 22 move towards the rear of the vehicle will cause a tightening of the cable 21 so that the brakes on the front wheels will be applied. Equalization of pull on the cable ends will be automatically produced by reason of the bight of the cable passing through the rock shaft 24 and over the sheaves 22 and 25.

The equalizing cable for the brakes of the rear wheels 11 is indicated at 27 and its ends are connected to rocker arms 28 which are pivotally mounted on a cross shaft 29 on the vehicle frame, this cross shaft being supported by a pair of separated brackets 30. A short link 31 connects each of the rocker arms 28 with one of the brake operating arms 16. The bight of the cable 27 passes over sheaves 32 on arms 33 on a rock shaft 34, and over sheaves 35 at the ends of the rock shaft. The cable also passes through the rock shaft 34 for equalizing the pulling strains just as the cable 21 does in connection with the rock shaft 24. Thus it will be seen that by rocking the shaft 34 so that the sheaves 32 are moved forwardly of the vehicle the cable 27 will be tightened and will thereby rock the arms 28 which will in turn pull on the rods 31 and consequently apply the brakes 13 of the rear wheels.

For the purpose of simultaneously rocking the two cross shafts 24 and 34, and with substantially the same applied force, there is a flexible connection shown in the form of a chain as at 36. One end of this chain is connected to an arm 37 secured to the shaft 24 and the bight of the chain passes over a sheave 38 mounted on an arm 39 on the shaft 34. In Fig. 1 the arm 39 is shown as a branch of the arm 33 above described, while in Figs. 4 and 5 it is shown as a separate arm secured to the cross shaft 34. The sheave 38 is pivoted at about one-half the distance from the axis of the shaft 34 as is the connection of the end of the chain to the arm 37 from the axis of the shaft 24. As a matter of fact, the sheave is mounted a little more than half the distance out so that a somewhat greater force will be applied to the rear wheels than to the front wheels to thereby produce a slightly greater braking action at the rear of the vehicle.

The other end of the chain 36 is connected to a rod 40 which leads forwardly of the vehicle to an arm 41 on the means for applying the brakes. It will be seen that by pulling forwardly on this rod 40 the downwardly extending arms 23 and 33 of the cross shafts 24 and 34 respectively will be rocked towards each other with substantially the same applied force, and thus both pairs of brakes will be simultaneously applied. Retracting springs 13' on the brakes 13 will return the brakes to their normal or unapplied position when the brake applying means is released and to insure that all of the brakes will be released to the same degree the arms 37 and 39 are respectively provided with stops 6 and 7 which abut against the adjacent frame member 19 as shown in Figs. 4 and 5. The arm 37 and its stop 6 is also shown in Fig. 5 in dotted lines in a position just before the stop comes to rest against the frame member 19.

When the brakes are applied by pulling the rod 40 forwardly the stops 6 and 7 will, of course, be moved away from the frame member 19 and all of the springs 13' of the brakes will be stretched as the cams separate the brake shoes. As the rod 40 is released the springs 13' will draw the brake shoes together and the shafts 24 and 34 will be rocked until the stops 6 and 7 strike against the abutment 19. Usually the stop 7 will first reach the abutment as the leverage is greatest on that rock shaft and then the rock shaft 24 will continue to move until the stop 6 reaches the abutment. In those positions of the rock shaft all four of the brakes are released and no brake drag results.

In the use of multiple brakes such as those described, where there is a considerable length of cable and other flexible connections, there is necessarily considerable stretching of the connections and springing of the mechanism so that a rather long travel of the rod 40 is required in moving the brakes from their unapplied to their fully applied position. Therefore, to connect the rod 40 to the ordinary foot lever such as has heretofore been used on motor vehicles, would require a greatly increased travel of such pedal or else the leverage would have to be so greatly decreased that a considerably greater amount of force would have to be applied to the brake pedal to operate the brakes. To overcome this objection, the present invention contemplates the use of means to change the movement ratio between the foot lever and the rod 40, so that the movement of this rod and its actuating lever 41 is increased with respect to the movement of foot lever 42, the lever 41 being moved through a greater angle than the foot lever. This means is so arranged that the leverage increases as the brakes are applied.

The particular arrangement and construction of this ratio multiplying means is illustrated herein but is claimed in a separate application. It is illustrated particularly in Figs. 2 and 4. It is connected between a foot lever 42 and the rod 40 above referred to, the unapplied position of the lever 42 being shown in full lines and the fully applied position being shown in dotted lines. The arm 41 to which the rod 40 is connected is by this movement of the lever 42 moved from the position in which said arm is shown in full lines to the position in which it is shown in dotted lines. And since the latter position is so nearly the dead center position for the rod 40 it is obvious that the leverage of the arm 41 is greatly increased over what it is in the full line position.

This ratio multiplying means is shown as mounted on a support 43 on the frame of the vehicle. A stud 44 having a flange 45 is secured by a nut 46 to the housing 43. This stud has a part 47 which extends into a two-part housing, the parts being indicated at 48 and 49 respectively. These parts are secured together and to the support 43 by several bolts 50, these bolts extending through both of the parts and into the support 43. Within the housing and mounted upon the part 47 of the stud is a rocking member 51 upon which, or integral with which, is the brake pedal 42 above referred to.

Mounted upon opposite sides of the axis of the member 51 are pinions 52 which mesh with an internal gear 53 formed in the part 49 of the housing. A pinion 54 meshes with the gears 52 and is formed with a shaft 55 which extends outwardly through the end of the housing and provides a mounting for the arm 41 hereinbefore referred to. If desired, the housing 49 may be formed with a boss 56 which forms a bearing internally for the shaft 55 and a bearing externally for a clutch pedal 57. A retracting spring 58 surrounds the hub part of the member 51 with one end secured to a pin 59 on the member 51 and the other end secured to the housing member 48 as at 60.

From the above it will be seen that a form of planetary gearing is used to multiply the action of the brake pedal 42 and the rod 40 is so connected to the arm 41 that the leverage of this multiplying action is greatly increased as the brake pedal is applied.

The housing of this multiplying mechanism may be removed as a unit from the support 43 by unscrewing the bolts 50 and disconnecting the rod 40. This will leave the stud 44 in place, but this may be removed also by removing the nut 46.

In addition to the foot applied brake mechanism described above, it is desirable that a vehicle should have a hand applied brake mechanism, one that may be used for holding a vehicle when the operator leaves it or for applying the brakes in an emergency in case of failure of the foot applied mechanism. The present invention contemplates the use of a brake applying mechanism entirely independent of the cable equalizing connections of the above described brake mechanism so that in case of breakage of any part of the cable, which is subject to considerable wear, at least part of the brakes may be applied to stop the vehicle.

As shown herein, this independently operating mechanism comprises a pair of arms 61 secured to the cross shaft 29 adjacent the respective rock arms 28, which arms have lugs 62 in which are adjustable bolts 63 the ends of which are adapted to abut against projections 64 on the arms 28. Thus the arms 28 may move freely forward without in any way disturbing the arms 61, but if the arms 61 are swung forwardly the arms 28 will be carried with them, which movement of the arms 28 will pull on the rods 31 and thereby apply the brakes 13 on the rear wheels 11. The arms 61 are moved by rocking the shaft 29 to which they are connected and this shaft is rocked by a hand lever 65 pivoted on the frame at 66 and connected to the cross shaft 29 by a rod 67 and an arm 68 connected to the shaft 29 as by forming it as a part of one of the arms 61, as shown in Figs. 1 and 2. A spring 69 connecting the arm 68 with a bracket 70 on the frame retains the cross shaft 29 in its retracted position.

From the above it will be seen that the brakes 12 of the rear wheels may be applied by moving the hand lever 65, which movement will rock the shaft 29 carrying both arms 61 forwardly and with them the arms 28. These arms are directly connected to the rear wheel brakes and the latter will be applied. In this movement of the arms 28 the cable 27 will simply be slackened and will hang loose. When the hand lever 65 is released the parts assume their normal position and the rear brakes, with the front brakes, may be applied by the foot lever 42.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A brake mechanism comprising equalizing connections for each brake to all of the brakes and non-equalizing operating connections for part of the brakes, substantially as described.

2. In a motor vehicle, the combination of front wheel brakes, rear wheel brakes, a cross shaft, arms on the cross shaft connected to operate the rear wheel brakes, means connected to the front wheel brakes and to said arms to operate all of said brakes simultaneously, means on the cross shaft to operate said arms, and a separate device connected to said cross shaft to operate the rear wheel brakes independently of the front wheel brakes.

3. In a motor vehicle, the combination of brakes on all four wheels, a single operating connection for applying all of said brakes simultaneously, an operating lever, and means between said lever and said connection to increase the angular movement of said connection.

4. In a motor vehicle, the combination of brakes on all four wheels, a longitudinally movable operating rod for applying all of said brakes simultaneously, an operating lever and means between said lever and said rod to change the movement ratio thereof.

5. In a motor vehicle, the combination of brakes on all four wheels, a single operating connection for applying all of said brakes simultaneously, an operating lever, and means to increase the movement ratio between said lever and said connection such that the leverage increases as the brakes are applied.

6. In a motor vehicle, the combination of brakes on all four wheels, a longitudinally movable operating rod for applying all of said brakes simultaneously, an operating lever, and means to multiply the movement ratio between said lever and said rod such that the leverage increases as the brakes are applied.

7. In a motor vehicle, in combination, brakes on opposite sides of the vehicle, a cross shaft mounted on the vehicle rocker arms independently and pivotally mounted on said cross shaft, connections from said arms to the brakes respectively, equalizing connections for operating said arms simultaneously to apply the brakes, connections between said cross shaft and both of said arms to rock said arms when the shaft is rocked in one direction, and means independent of said equalizing connections for rocking said cross shaft and thereby applying the brakes.

8. In a motor vehicle, in combination, brakes on opposite sides of the vehicle, a cross shaft mounted on the vehicle, rocker arms independently and pivotally mounted on said cross shaft, connections from said arms to the brakes respectively, equalizing connections for operating said arms simultaneously to apply the brakes, a lever connected to operate said equalizing connections, connections between said cross shaft and both of said arms to rock said arms when the shaft is rocked in one direction, and a second lever and connections independent of said equalizing connections for rocking said cross shaft and thereby applying the brakes.

9. In a motor vehicle, the combination of front wheel brakes and rear wheel brakes, two cross shafts arranged adjacent each other on the vehicle, equalizing connections from each of said cross shafts to a pair of said brakes, a short lever arm on one of said cross shafts and a long lever arm on the other said cross shaft, a sheave on the short lever arm, and a flexible connection having one end connected to the long lever arm and passing over the sheave of the short lever arm, for rocking both of said cross shafts simultaneously and with substantially the same applied force.

10. In a motor vehicle, the combination of front wheel brakes and rear wheel brakes, two cross shafts arranged adjacent each other on the vehicle, equalizing connections from each of said cross shafts to a pair of said brakes, a sheave mounted on one of said cross shafts, a flexible connection having one end attached to the other cross shaft radially farther from the axis thereof than is the sheave from the axis of its cross shaft, said flexible connection passing over said sheave, and a lever connected to operate said flexible connection for rocking said cross shafts with substantially the same applied force.

11. A brake mechanism comprising brakes having retracting springs, two rock shafts for operating said brakes, means for simultaneously rocking said shafts, and stops to limit the retracting movement of said rock shafts.

12. In a motor vehicle, the combination of brakes on the four wheels, and retracting means for said brakes, of means connecting the brakes in pairs, and stops for limiting the retracting movement of each pair.

13. In a motor vehicle, the combination of brakes on the four wheels, and retracting means for said brakes, of means connecting the brakes in pairs, means for operating all the brakes simultaneously, and stops for limiting the retracting movement of each pair.

In testimony whereof I affix my signature.

ALFRED MOORHOUSE.